United States Patent
Kanei et al.

(10) Patent No.: US 7,629,717 B2
(45) Date of Patent: Dec. 8, 2009

(54) TOTALLY-ENCLOSED FAN-COOLED MOTOR

(75) Inventors: Nobuhiro Kanei, Tokyo (JP); Seiji Haga, Tokyo (JP); Kiyoshi Horiuchi, Tokyo (JP); Kenji Sonoyama, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 0 days.

(21) Appl. No.: 11/629,973

(22) PCT Filed: Jun. 20, 2005

(86) PCT No.: PCT/JP2005/011278

§ 371 (c)(1),
(2), (4) Date: Dec. 19, 2006

(87) PCT Pub. No.: WO2005/124971

PCT Pub. Date: Dec. 29, 2005

(65) Prior Publication Data

US 2008/0036314 A1      Feb. 14, 2008

(30) Foreign Application Priority Data

Jun. 21, 2004   (JP) ............................. 2004-182612
Apr. 7, 2005    (WO) ................. PCT/JP2005/006881

(51) Int. Cl.
    *H02K 9/06*       (2006.01)
(52) U.S. Cl. ....................................... 310/64; 310/68 D
(58) Field of Classification Search ................ 310/68 D, 310/64; *H02K 009/06*
    See application file for complete search history.

(56) References Cited

U.S. PATENT DOCUMENTS

| | | | | |
|---|---|---|---|---|
| 1,852,476 A | * | 4/1932 | Pfleger ......................... | 310/57 |
| 3,610,975 A | * | 10/1971 | Onjanow ...................... | 310/57 |
| 3,749,953 A | * | 7/1973 | Baumann et al. .............. | 310/62 |
| 4,186,317 A | * | 1/1980 | Sisk ........................... | 310/60 R |
| 4,476,405 A | * | 10/1984 | Komurasaki ................. | 310/60 R |

(Continued)

FOREIGN PATENT DOCUMENTS

| JP | 55160952 A | * 12/1980 |
|---|---|---|
| JP | 57-043536 A | 3/1982 |
| JP | 62071452 A | * 4/1987 |
| JP | UM-A-2-68653 A | 5/1990 |
| JP | UM-A-2-88441 A | 7/1990 |

(Continued)

*Primary Examiner*—Quyen Leung
*Assistant Examiner*—Naishadh N Desai
(74) *Attorney, Agent, or Firm*—Buchanan Ingersoll & Rooney PC

(57) ABSTRACT

In a totally-enclosed fan-cooled motor wherein a drive side of a rotation shaft and a side opposite to the drive side are held by means of bearings and so that drive power would be transmitted from the drive side of the rotation shaft with which a rotor is formed into one body, wind is sent to an outer side of the motor in an axial direction of the rotation shaft by means of an external fan provided on the side opposite to the drive side to cool a stator in the air-tightly closed motor and air in the motor is circulated by means of an internal fan provided in the motor to cool a rotor, provided is a radiator mounted to the rotation shaft so as to be located on an outer side of the bearing holding the drive side of the rotation shaft, outside the motor, and in the vicinity of the bearing. This allows a cooling effect of the bearing provided on the drive side to be improved.

11 Claims, 13 Drawing Sheets

U.S. PATENT DOCUMENTS

| | | | |
|---|---|---|---|
| 4,742,257 A * | 5/1988 | Carpenter | 310/62 |
| 4,908,538 A * | 3/1990 | Geberth, Jr. | 310/59 |
| 5,093,591 A * | 3/1992 | Kitamura et al. | 310/62 |
| 5,789,833 A * | 8/1998 | Kinoshita et al. | 310/64 |
| 5,925,947 A * | 7/1999 | Kajiwara et al. | 310/64 |
| 6,246,134 B1 * | 6/2001 | Berrong et al. | 310/52 |
| 6,700,235 B1 * | 3/2004 | McAfee | 310/52 |
| 6,774,514 B2 * | 8/2004 | Matsuoka et al. | 310/58 |
| 6,815,849 B2 * | 11/2004 | Serizawa et al. | 310/62 |
| 6,903,472 B2 * | 6/2005 | Ogi | 310/68 D |
| 2001/0017498 A1 * | 8/2001 | Matsuoka et al. | 310/90 |
| 2004/0145253 A1 * | 7/2004 | Browne et al. | 310/58 |

FOREIGN PATENT DOCUMENTS

| | | | |
|---|---|---|---|
| JP | UM-A-3-70049 A | | 7/1991 |
| JP | 06178501 A | * | 6/1994 |
| JP | 06335202 A | * | 12/1994 |
| JP | 2002-010575 A | | 1/2002 |
| JP | 2002-027708 A | | 1/2002 |
| JP | 2002010575 A | * | 1/2002 |
| JP | 2002027708 A | * | 1/2002 |
| JP | 2002051503 A | * | 2/2002 |
| JP | 2002-218704 A | | 8/2002 |
| JP | 2002218704 A | * | 8/2002 |
| JP | 2003-143809 A | | 5/2003 |
| JP | 2003143809 A | * | 5/2003 |
| JP | 2003180051 A | * | 6/2003 |
| JP | 2003-319605 A | | 11/2003 |
| JP | 2003319605 A | * | 11/2003 |
| JP | 2004312875 A | * | 11/2004 |
| JP | 2006314183 A | * | 11/2006 |

* cited by examiner (a)

(b)

(a)

(b)

(c)

TOTALLY-ENCLOSED FAN-COOLED MOTOR

BACKGROUND OF THE INVENTION

1. Field of the Invention

The present invention relates to a totally-enclosed fan-cooled motor in which a stator in an air-tightly closed motor is cooled by means of an external fan provided out of the motor while a rotator is cooled by means of an internal fan provided in the motor.

2. Description of the Related Art

In a conventional totally-enclosed fan-cooled motor, an external fan provided on a side opposite to a drive side is used so that cooling air would flow in a first ventilation path formed in a stator to cool the stator while air is circulated in a second ventilation path formed in a core of a rotor and in a third ventilation path formed in a core of the stator in the air-tightly closed motor by means of an internal fan. This allows air in the motor to be heat-exchanged with air passing through the first ventilation path in a process of flowing in the third ventilation path, and thereby, to be cooled (refer to JP-A-2003-143809, for example).

In such a conventional totally-enclosed fan-cooled motor, the external fan can function as a coolant, and thereby, cool the heat in a bearing provided on a side of the external fan. A bearing provided on a drive side opposite to the side of the external fan, however, is difficult to be cooled, so that there is a problem that deterioration in bearing grease is likely to occur.

SUMMARY OF THE INVENTION

In order to solve the above-mentioned problem, an object of the invention is to provide a totally-enclosed fan-cooled motor capable of improving a cooling effect of a bearing provided on a drive side.

The totally-enclosed fan-cooled motor in accordance with the invention is a totally-enclosed fan-cooled motor including: a stator provided in the air-tightly closed motor; a rotor provided oppositely to the stator and mounted to a rotation shaft; a pair of bearings for holding a drive side and a side opposite to the drive side of the rotation shaft; an external fan provided on the side opposite to the drive side of the rotation shaft and outside the motor for sending wind to the stator; and an internal fan provided inside the motor for circulating air in the motor to send wind to the rotor and the stator, the totally-enclosed fan-cooled motor characterized by comprising: a radiator mounted to the rotation shaft so as to be located on an outer side of the bearing holding the drive side of the rotation shaft, outside the motor and in the vicinity of the bearing for cooling the bearing holding the drive side of the rotation shaft. This allows a cooling effect of the bearing holding the drive side to be improved.

BRIEF DESCRIPTION OF THE DRAWINGS

The foregoing and other objects, features, aspects and advantages of the present invention will become more apparent from the following detailed description of the present invention when taken in conjunction with the accompanying drawings, wherein:

FIG. 2 shows a first embodiment of the invention, wherein FIG. 2A is a front view of an integral part in FIG. 1 and FIG. 2B is a sectional view taken away from a line II-II from a view in a direction shown by arrows in FIG. 2A;

FIG. 4 shows a second embodiment of the invention, wherein FIG. 4A is a front view of an integral part in FIG. 3, FIG. 4B is a sectional view taken away from a line IV-IV from a view in a direction shown by arrows in FIG. 4A and FIG. 4C is a back view;

FIG. 7 shows a fourth embodiment of the invention, wherein FIG. 7A is a front view of an integral part in FIG. 6, FIG. 7B is a sectional view taken away from a line VII-VII from a view in a direction shown by arrows in FIG. 7A and FIG. 7C is a back view;

FIG. 9 shows a fifth embodiment of the invention, wherein FIG. 9A is a front view of an integral part in FIG. 8, FIG. 9B is a sectional view taken away from a line IX-IX from a view in a direction shown by arrows in FIG. 9A and FIG. 9C is a back view;

FIG. 11 shows a sixth embodiment of the invention, wherein FIG. 11A is a front view of an integral part in FIG. 10, FIG. 11B is a sectional view taken away from a line XI-XI from a view in a direction shown by arrows in FIG. 11A and FIG. 11C is a back view;

DETAILED DESCRIPTION OF THE INVENTION

First Embodiment

Figure 1:
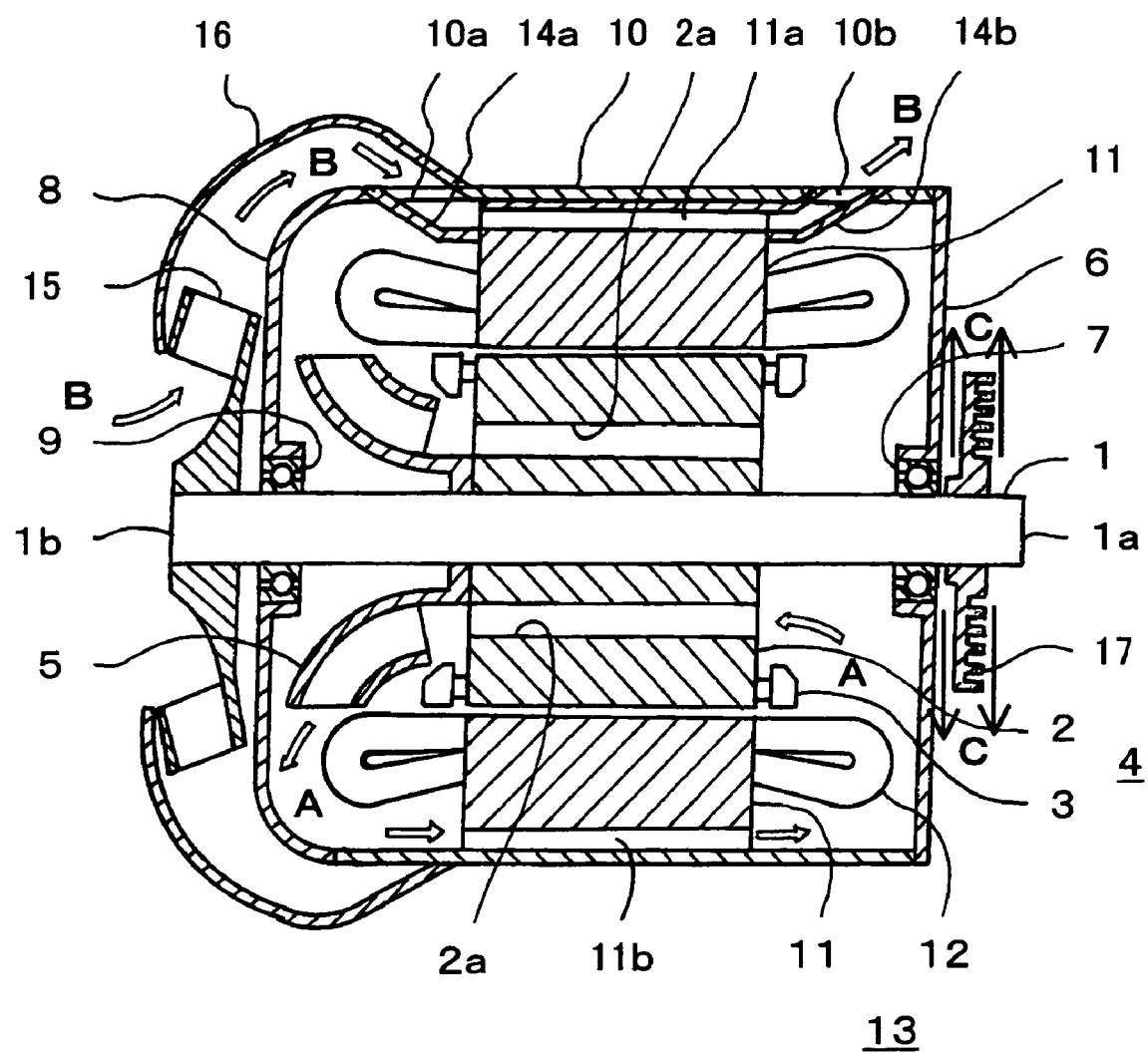
FIG. 1 is a sectional view of a totally-enclosed fan-cooled motor in a first embodiment of the invention.

FIG. 1 is a sectional view of a totally-enclosed fan-cooled motor in a first embodiment for carrying out the invention. FIG. 2A is a front view of an integral part in FIG. 1. FIG. 2B is a sectional view taken away from a line II-II in FIG. 2A from a view in a direction shown by arrows. Same elements are marked with the same reference signs and numerals in FIGS. 1, 2A and 2B.

Figure 2:
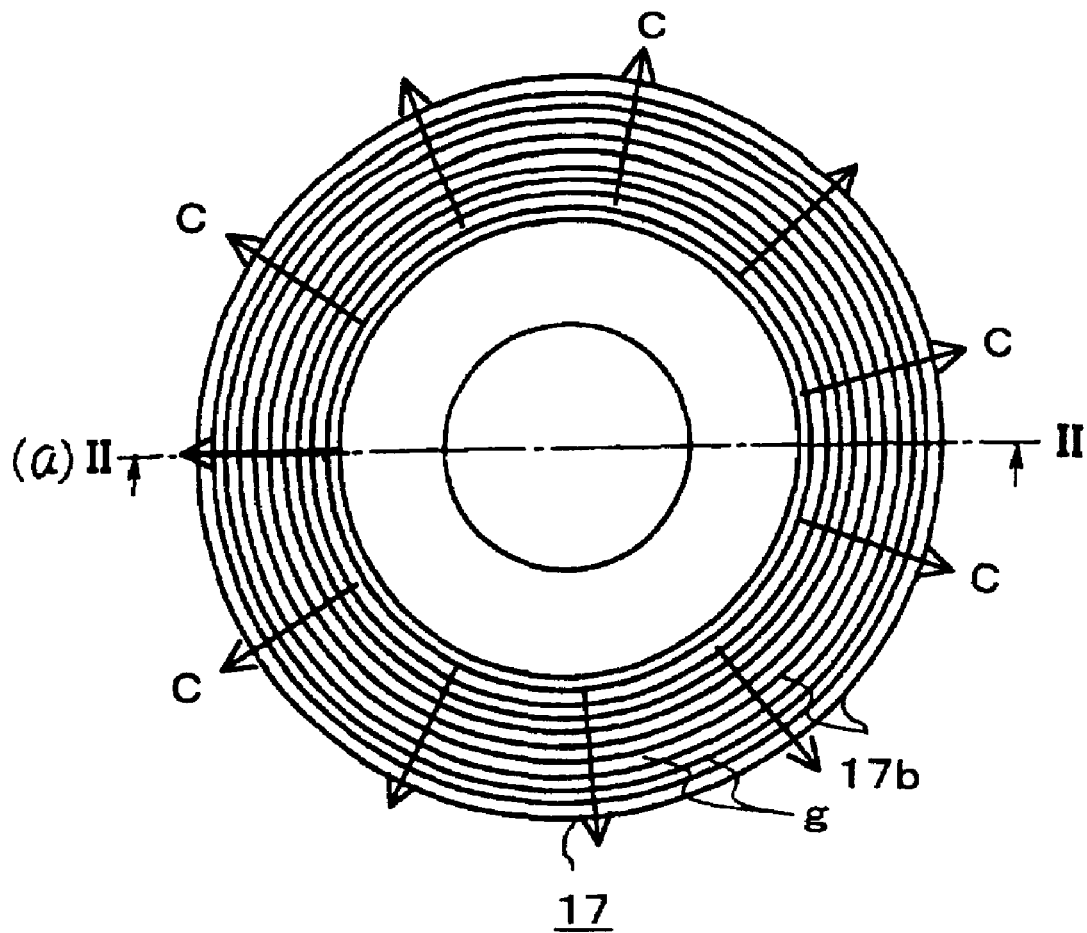
Figure 2:
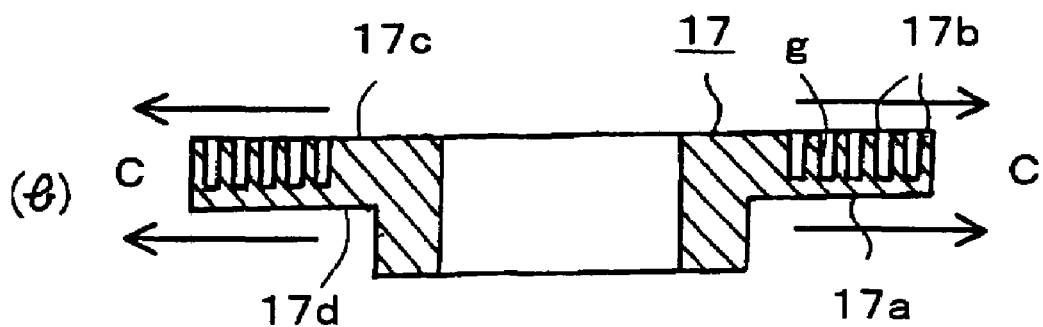

In FIGS. 1 and 2, a drive side 1a of a rotation shaft 1 is connected to a vehicle shaft (not shown) through reduction gear (not shown) in the case of a use for a vehicle, for example, so as to drive vehicle wheels (not shown) mounted to the vehicle shaft to run the vehicle. Plural ventilation paths 2a are formed in a circumferential direction in a rotor core 2 connected to the rotation shaft 1 into one body so as to pass through the rotor core 2 in an axial direction of the rotation shaft 1. A rotor conductor 3 is provided on an outer circumference of the rotation core 2. The rotor core 2 and the rotor conductor 3 form a rotor 4. An internal fan 5 is provided on a side 1b opposite to the drive side of the rotation shaft 1 so as to absorb air in the respective ventilation paths 2a and connected to the rotation shaft 1 into one body.

A bearing 7 on the drive side, which is provided on a drive side bracket 6, holds the drive side 1a of the rotation shaft 1 so that the drive side 1a would rotate freely. A bearing 9 on the side 1b opposite to the drive side, which is provided on a bracket 8 on the side opposite to the drive side, holds the side 1b opposite to the drive side of the rotation shaft 1 so that the side 1b opposite to the drive side would rotate freely. The both brackets 6 and 8 are connected by means of a frame 10 to enclose the rotor 4 so as to cut off ventilation between the inside and the outside of the motor housing the rotor 4.

A stator core 11 is provided on an inner side of the frame 10 in the motor so as to be faced to the rotor core 2. The stator core 11 is provided with a stator winding 12. Further, the stator core 11 is provided with respective plural ventilation paths 11a and 11b extending in an axial direction of the rotation shaft 1 so as to be alternately provided in the outer circumferential direction. The stator core 11 and the stator winding 12 form a stator 13. The ventilation path 11a communicates with external air holes 10a and 10b provided on the frame 10 through conduits 14a and 14b.

An external fan 15 provided on the side 1b opposite to the side of the rotation shaft 1 and outside the motor is connected to the rotation shaft 1 into one body. A fan cover 16 is provided so that flow of air generated by rotation of the external fan 15 would be introduced into the ventilation path 11a through the conduit 14. A radiator 17 connected to the rotation shaft 1 into one body is provided on the outer side of the bearing 7, which holds the drive side 1a of the rotation shaft 1, outside the motor and in the vicinity of the bearing 7. The radiator 17 comprises a disk-shaped plate part 17a formed concentrically with the rotation shaft 1 and plural annular cooling pieces 17b formed concentrically with the rotation shaft 1 so as to project to a side opposite to the bearing 7 (namely, project to the drive side). The plural annular cooling pieces 17b are respectively different in diameter as shown in the drawings. Predetermined gaps g are formed between the respective cooling pieces 17b for the purpose of improving cooling effect.

In a totally-enclosed fan-cooled motor having such a structure, air enclosed in the motor by means of the both brackets 6 and 8 and the frame 10 is circulated in the order from the ventilation path 2a and the ventilation path 11b by means of the internal fan 5 as shown by a white arrow A. On the other hand, air taken into the fan cover 16 by means of the external fan 15 is let flow in the order from the external air hole 10a, the ventilation path 11a and the external air hole 10b as shown by a white arrow B to be heat-exchanged with air of high temperature, which flows in the adjacent ventilation path 11b in the motor. The heat of the air of high temperature, which flows in the ventilation path 11b in the motor, is radiated to the outside of the motor through the air flowing as shown by the arrow B.

On the side 1b opposite to the drive side, the heat generated in the rotor 4 is radiated from the rotation shaft 1 through the external fan 15. On the other hand, on the drive side 1a, the heat generated in the rotor 4 is radiated from the radiator 17 via the rotation shaft 1. Similarly to the above, heat of the bearing 7 on the drive side is also radiated from the radiator 17 through the rotation shaft 1. The radiator 17 rotates with the rotation shaft 1 as the rotor 4 rotates. Accordingly, centrifugal force causes a radial air flow about the center of the rotation of the radiator 17 along a side surface 17c of the drive side of the radiator 17 and a side surface 17d of the side opposite to the drive side, as shown by an arrow C. The air flow cools the radiator 17, so that temperature of the bearing 7 on the driving side is decreased. Further, generation of the radial air flow about the center of the rotation of the radiator 17 also causes a flow of warm air having stayed on the drive side of the bearing 7 on the drive side in the case of providing no radiator 17. This allows temperature of the bearing 7 on the driving side to be decreased. That is to say, heat of the bearing 7 on the drive side is radiated from the radiator 17 via the rotation shaft 1 and by means of the radial air flow about the center of the rotation of the radiator 17, and thereby, cooled efficiently.

As described above, providing the radiator 17 mounted to the rotation shaft 1 into one body on the outer side of the bearing 7, which holds the driving side 1a of the rotation shaft 1, outside the motor and in the vicinity of the bearing 7 allows a cooling effect of the bearing 7 holding the drive side 1a to be further improved. Moreover, forming the cooling piece 17b formed in the radiator 17 concentrically with the rotation shaft 1 allows the radiation area of the radiator 17 to be increased, so that the cooling effect can be further improved.

Second Embodiment

Figure 3:
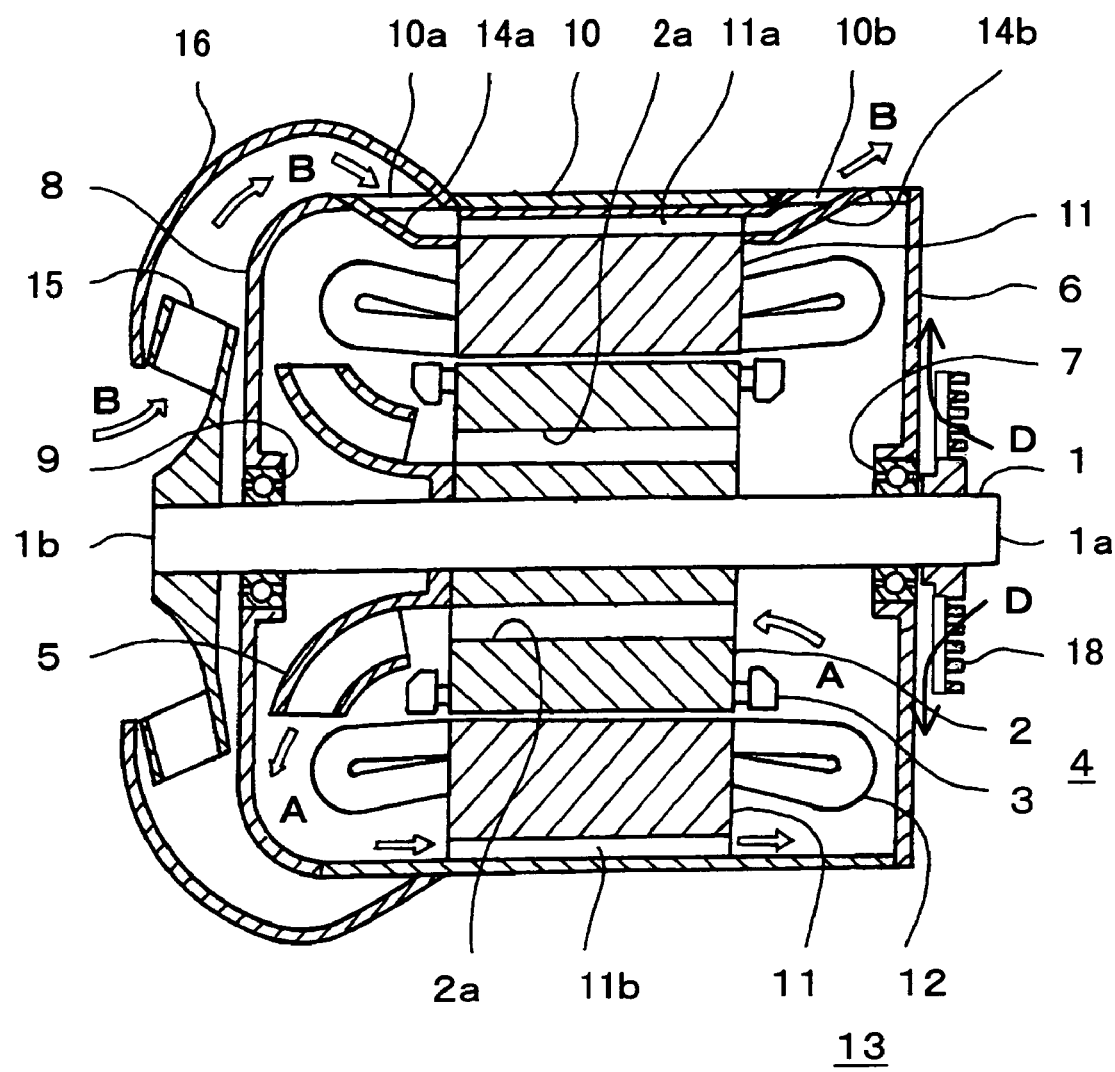
FIG. 3 is a sectional view of a totally-enclosed fan-cooled motor in a second embodiment of the invention.
Figure 4:
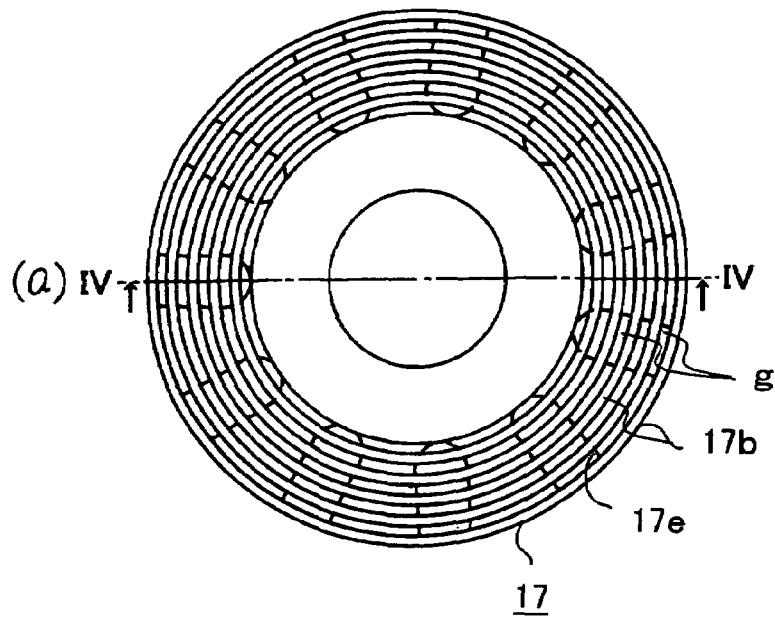
Figure 4:
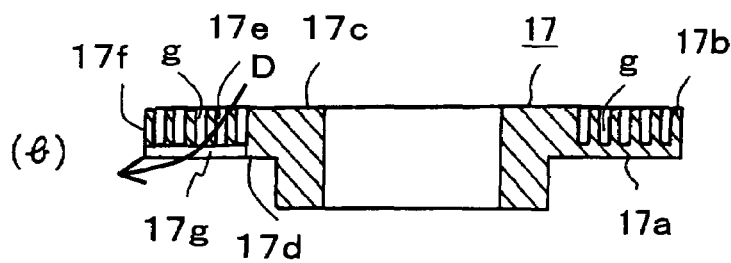
Figure 4:
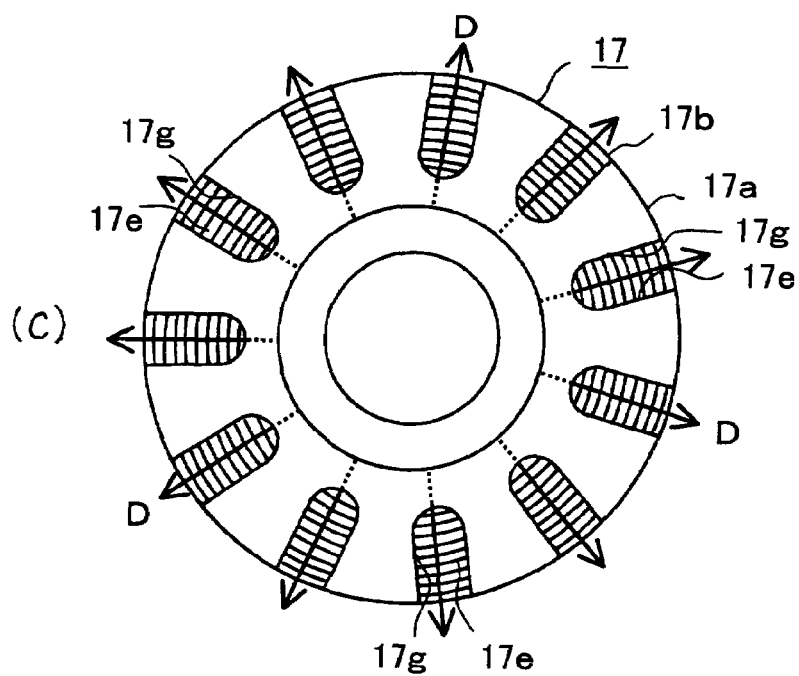

FIG. 3 is a sectional view of a totally-enclosed fan-cooled motor in a second embodiment for carrying out the invention. FIG. 4A is a front view of an integral part in FIG. 3. FIG. 4B is a sectional view taken away from a line IV-IV in FIG. 4A from a view in a direction shown by arrows. FIG. 4C is a back view. Same elements are marked with the same reference signs and numerals in FIGS. 3 and 4. Further, elements same as or equal to those in FIGS. 1 and 2 are marked with the same reference signs and numerals. The second embodiment of the invention will be described hereinafter mainly in a point different from the first embodiment of the invention. Description other than the different point will be omitted.

In FIGS. 3 and 4, the radiator 17 is connected to the rotation shaft 1 into one body on the outer side of the bearing 7 holding the drive side 1a of the rotation shaft 1, outside the motor and in the vicinity of the bearing 7. Similarly to the above-mentioned case of the first embodiment of the invention, the radiator 17 comprises a disk-shaped plate part 17a, which is provided on a side of the bearing 7 holding the drive side 1a of the rotation shaft 1 and which is formed concentrically with the rotation shaft 1, and plural annular cooling pieces 17b formed concentrically with the rotation shaft 1 so as to project from the disk-shaped plate part 17a to the rotation shaft 1 on a side opposite to the bearing 7. In the second embodiment of the invention, the disk-shaped plate part 17a is further provided with plural flow paths 17e as shown by arrows D for the purpose of letting air flow from a side of the cooling pieces 17b to a side of the bearing 7. The plural flow paths 17e comprise plural grooves 17g extending in a direction away from the rotation shaft 1 on the side opposite to the drive side of the radiator 17, one end of each of the grooves 17g being open to an outer circumferential surface 17f of the radiator and the other end being closed, and annular gaps g between the respective annular cooling pieces 17b. The plural grooves 17g are communicated with the gaps g. In other words, the radiator includes plural through holes 17e passing through both of a surface 17c of the drive side and a surface 17d of the side opposite to the drive side.

In a totally-enclosed fan-cooled motor having such a structure, air in the respective grooves 17g, 17, . . . are let out from the inner circumferential side to the outer circumferential side (that is, in a direction radially away from the rotation shaft 1) while air between the drive side bracket 6 and the radiator 17 is also let out from the inner circumferential side to the outer circumferential side of the radiator 17 when the radiator 17 rotates in accordance with rotation of the rotor 4. Accordingly, cool air on the drive side of the radiator 17 flows from the gaps g, g, . . . between the respective cooling pieces 17b, 17b, . . . as shown by the arrows D to flow to a space between the drive side bracket 6 and the radiator 17 via the respective grooves 17g, 17g, . . . . This allows the radiator 17 and the bearing 7 on the drive side to be cooled more effectively than the above-mentioned case of the first embodiment of the invention.

Third Embodiment

Figure 5:
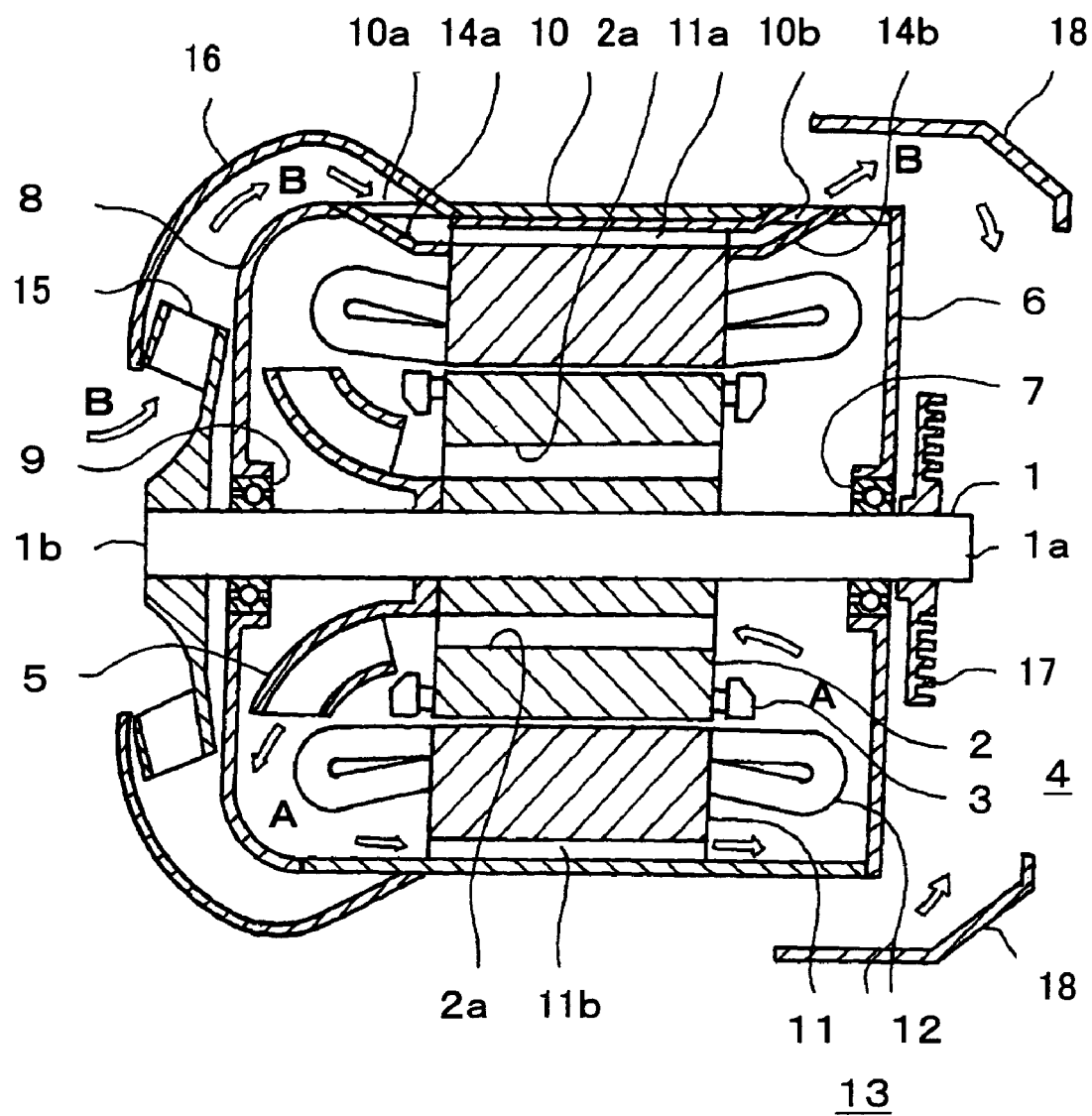
FIG. 5 is a sectional view of a totally-enclosed fan-cooled motor in a third embodiment of the invention.

FIG. 5 is a sectional view of a totally-enclosed fan-cooled motor in a third embodiment for carrying out the invention. In FIG. 5, elements same as or equal to those in FIGS. 1 to 4 are marked with the same reference signs and numerals. The third embodiment of the invention will be described hereinafter mainly in a point different from the first and second embodiments of the invention. Description other than the different point will be omitted.

In FIG. 5, provided is a wind direction guide 18 on a side opposite to the external fan 15 provided on the side 1b opposite to the drive side (namely, on the drive side) and on an outer side of the external air hole 10b in the diameter direction so as to fence the radiator 17. The wind direction guide 18 is formed in order to receive the wind sent from the external fan 15 through the external air hole 10b to change a direction of the wind toward the radiator 17.

In a totally-enclosed fan-cooled motor having such a structure, the wind direction guide 18 changes a direction of a flow of the wind sent through the ventilation hole 10b into a direction toward the center of the rotation shaft 1 along the drive side bracket 6 so that the wind flows in contact with the radiator 17. This allows the radiator 17 to be effectively cooled.

For example, in the case that the quantity of the wind from the external fan 15 is 11 m$^3$/min and an outer diameter of the radiator 17 is 210 mm in a totally-enclosed fan-cooled motor in which an output thereof is 180 kw, an outer diameter of the frame 10 is 670 mm and a length of the rotation shaft 1 in the axial direction is 580 mm, the quantity of the heat radiated from the radiator 17 and the rotation shaft 1 is one and a half times as much as that of the heat only radiated from the rotation shaft 1.

Thus, providing the wind direction guide 18 for receiving the wind sent from the external fan 15 to change a direction of the wind toward the radiator 17 allows the radiation of heat from the radiator 17 to be accelerated. This causes increase in quantity of heat transfer due to heat transmission from the rotation shaft 1 to the radiator 17, so that a rise in temperature of the bearing 7 on the drive side can be further kept down.

Now, described will be a case of using the radiator 17 in Embodiment 2 of the invention (refer to FIG. 4) instead of the radiator 17 in the first embodiment of the invention (refer to FIG. 2) in the third embodiment of the invention.

For example, in the case that the quantity of the wind from the external fan 15 is 11 m$^3$/min, an outer diameter of the radiator 17 is 210 mm and the cross section of the flow path 17e is 8,100 mm$^2$ in a totally-enclosed fan-cooled motor in which an output thereof is 180 kw, an outer diameter of the frame 10 is 670 mm and a length of the rotation shaft 1 in the axial direction is 580 mm, the quantity of the heat radiated from the radiator 17 and the rotation shaft 1 is 1.8 times as much as that of the heat only radiated from the rotation shaft 1. This means that a rise in temperature of the bearing 7 on the drive side can be reduced by 15% in a value of a rise in temperature.

As described above, providing the wind direction guide 18 at the same time as using the radiator 17 provided with the flow path 17e allows the wind from the external fan 15 to pass through the flow path 17e, so that the heat-radiation area of the radiator 17 is increased to further keep down a rise in temperature of the bearing 7 on the drive side. Providing the wind direction guide 18 in the first embodiment of the invention allows the radiator 17 to be cooled more effectively than the case of the first embodiment of the invention. When the wind direction guide 18 is provided in the second embodiment of the invention, the radiator 17 can be cooled more effectively than the case of the second embodiment of the invention.

Fourth Embodiment

Figure 6:
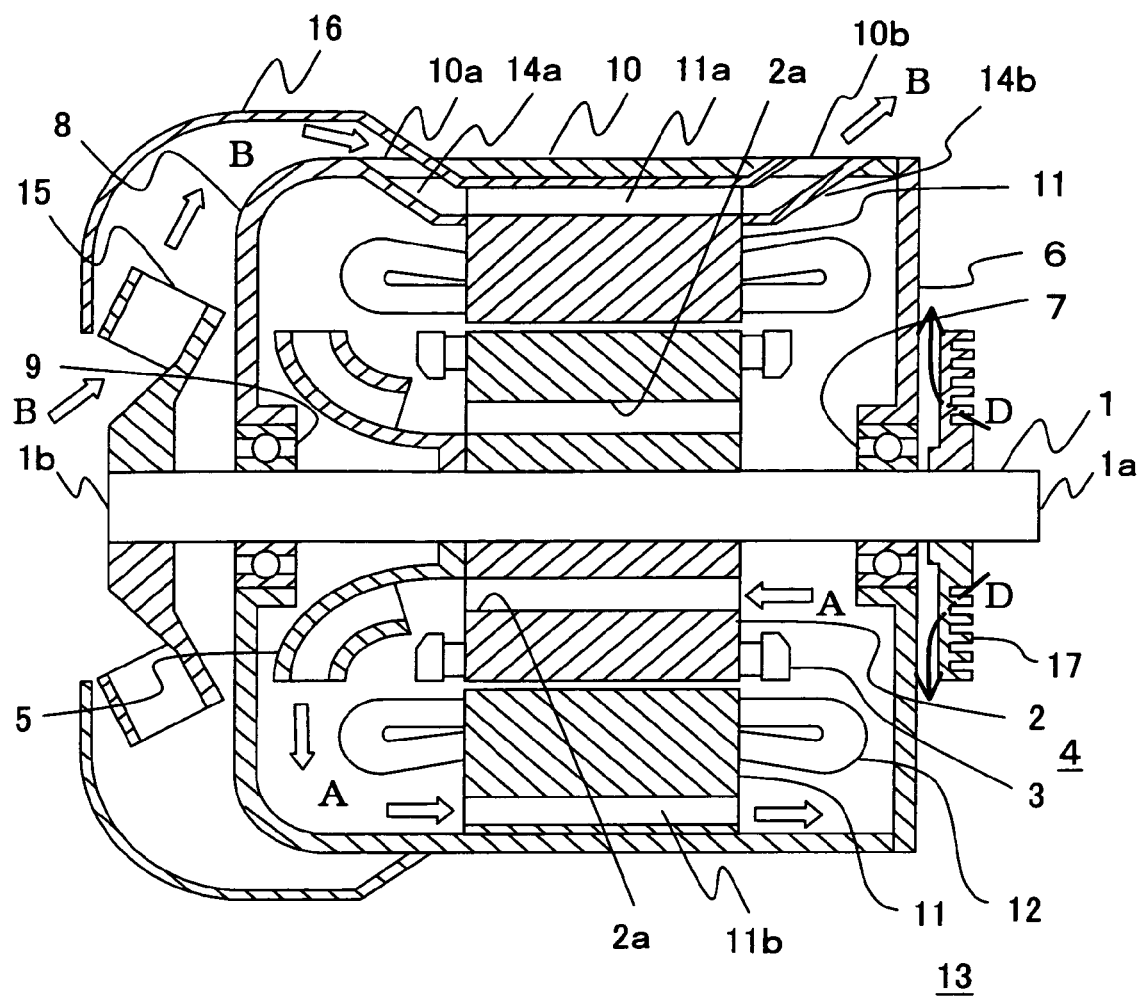
FIG. 6 is a sectional view of a totally-enclosed fan-cooled motor in a fourth embodiment of the invention.
Figure 7:
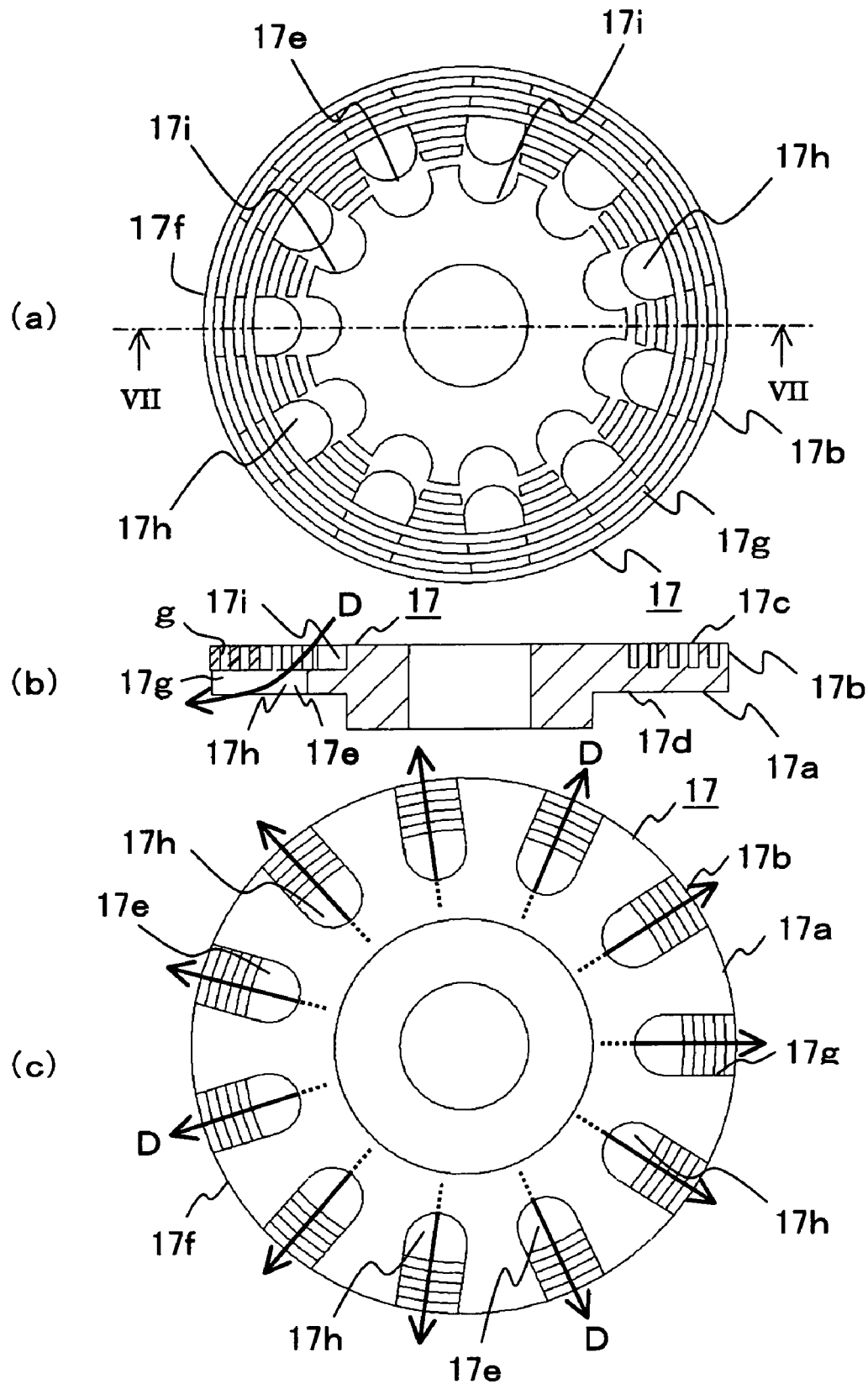

FIG. 6 is a sectional view of a totally-enclosed fan-cooled motor in a fourth mode for carrying out the invention. FIG. 7A is a front view of an integral part in FIG. 6. FIG. 7B is a sectional view taken away from a line VII-VII in FIG. 7A. FIG. 7C is a back view. In FIGS. 6 and 7, elements same as or equal to those in FIGS. 1 to 4 are marked with the same reference signs and numerals. The fourth embodiment of the invention will be described hereinafter mainly in a point different from the first to third embodiments of the invention. Description other than the different point will be omitted.

In FIGS. 6 and 7, provided at the bases of the respective grooves 17g on the side opposite to the drive side of the radiator 17 are through holes 17h, which pass through the radiator 17 in an extending direction of the rotation shaft 1 and which are larger in dimension in the diameter direction than the gaps g between the cooling pieces 17b. The through holes 17h, 17h, . . . respectively pass through the annular cooling pieces 17b on the inner side in the diameter direction.

In a totally-enclosed fan-cooled motor having such a structure, when the radiator 17 rotates in accordance with rotation of the rotor 4, cool air on the drive side of the radiator 17 flows through the plural through holes 17h, 17h, . . . , the plural gaps g, g, . . . between the respective cooling pieces 17b, 17b, . . . and the plural grooves 17g, 17g, . . . on the side opposite to the drive side to a space between the drive side bracket 6 and the radiator 17, as shown by the arrows D, similarly to the above-mentioned case in FIG. 4. The quantity of the air is more than that of the case in FIG. 4 since the plural through holes 17h, 17h, . . . whose dimension in the diameter direction is larger than that of the gaps g between the cooling pieces 17b and which pass through the annular cooling pieces 17b on the inner side in the diameter direction are provided. Accordingly, the radiator 17 and the bearing 7 on the drive side can be cooled more effectively than the above-mentioned case in FIG. 4.

Moreover, plural second grooves 17i, 17i, . . . are radially provided on a surface 17c of the disk-shaped plate part 17a on a side opposite to the side of the bearing 7 (namely, the surface 17c on the drive side) so as to be located in the position closer to the rotation shaft 1 than the through holes 17h, 17h, . . . . Providing the plural second grooves 17i, 17i, . . . on the drive side allows the cool air on the drive side of the radiator 17 to flow to a space between the drive side bracket 6 and the radiator 17 via the plural second grooves 17i, 17i, . . . on the drive side, the plural through holes 17h, 17h, . . . , the plural gaps g, g, . . . between the respective cooling pieces 17b, 17b, . . . and the plural grooves 17g, 17g, . . . on the side opposite to the drive side, as shown by the arrows D. Accordingly, the quantity of the air is further increased. This as well as an effect of enlarging the radiation area of the radiator 17 by means of the plural second grooves 17i, 17i, . . . on the drive side allows a cooling effect of the radiator 17 and the bearing 7 on the driving side to be further improved.

In the fourth embodiment of the invention, in the case that the radiator 17 is mounted to a totally-enclosed fan-cooled motor in which an output is 150 kw, an outer diameter of the frame 10 is 580 mm and a length of the rotation shaft 1 in the axial direction is 530 mm, for example, a rise in temperature of the bearing 7 can be reduced by 17% in a value of a rise in temperature, compared with the case of providing no radiator 17.

In the fourth embodiment of the invention, the air-flow path 17e comprises the plural through holes 17h, 17h, ..., the gaps g, g, ... between the respective cooling pieces 17b and the plural grooves 17g, 17g, ....

Fifth Embodiment

Figure 8:
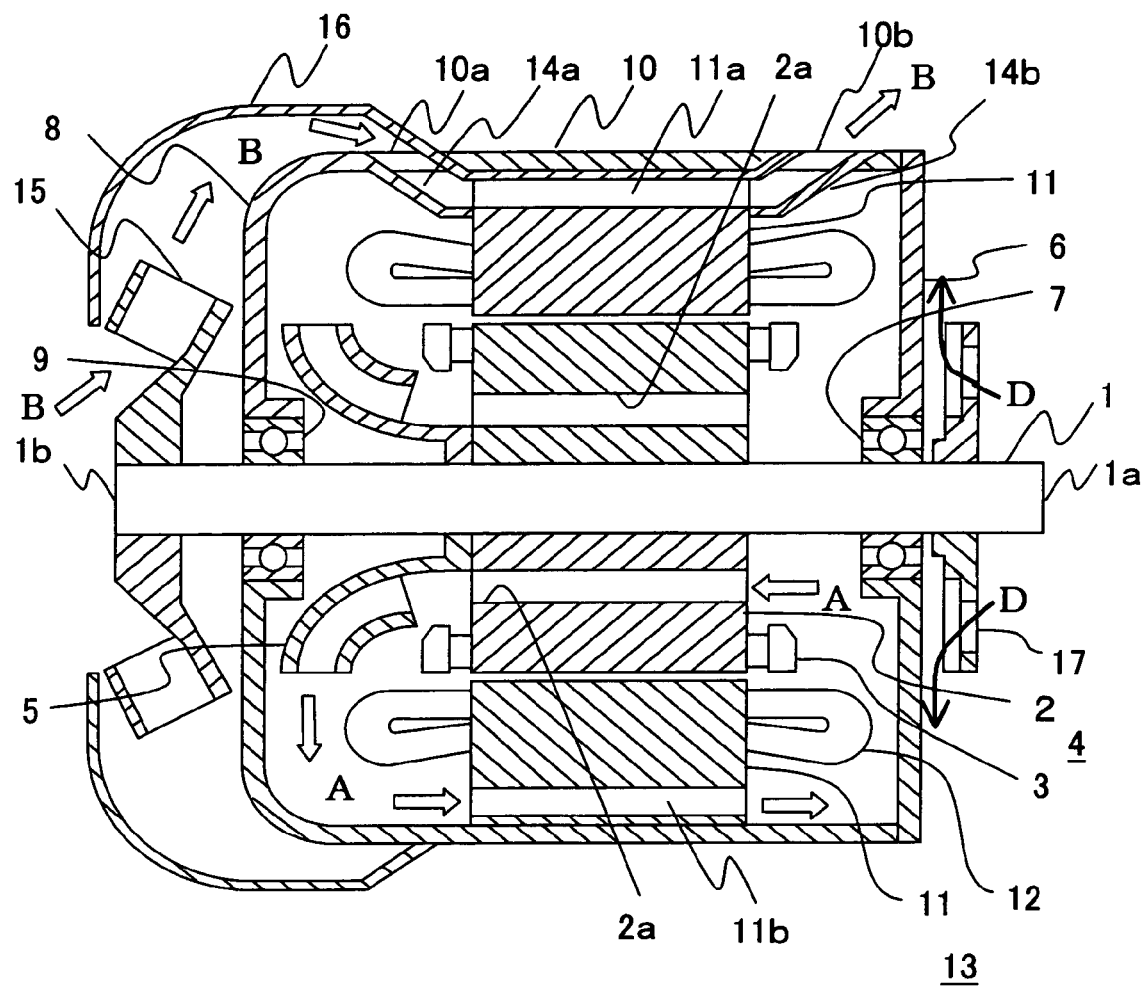
FIG. 8 is a sectional view of a totally-enclosed fan-cooled motor in a fifth embodiment of the invention.
Figure 9:
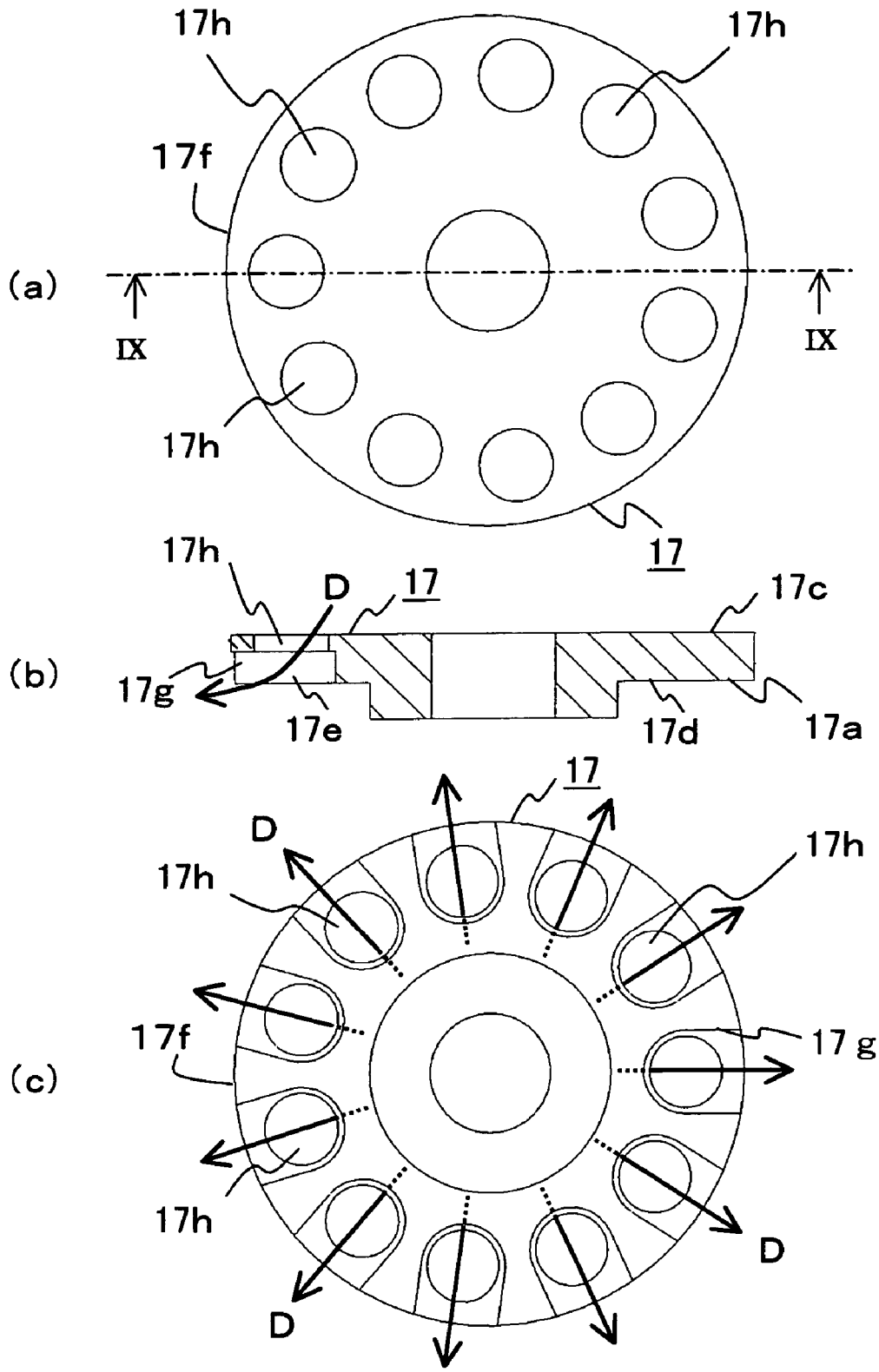

FIG. 8 is a sectional view of a totally-enclosed fan-cooled motor in a fifth mode for carrying out the invention. FIG. 9A is a front view of an integral part in FIG. 8. FIG. 9B is a sectional view taken away from a line IX-IX in FIG. 9A. FIG. 9C is a back view. In FIGS. 8 and 9, elements same as or equal to those in FIGS. 1 to 7 are marked with the same reference signs and numerals. The fifth embodiment of the invention will be described hereinafter mainly in a point different from the first to fifth embodiments of the invention. Description other than the different point will be omitted.

In FIGS. 8 and 9, the surface 17c on the drive side of the radiator 17 is a flat surface provided with no cooling piece 17b shown in the first to fourth embodiments of the invention. Further, on the surface 17d on the side opposite to the drive side of the radiator 17, provided are the plural grooves 17g, 17g, ... as well as the cases in FIGS. 4 and 7. The grooves 17g, 17g, ... are respectively provided on their bases (at parts closer to the rotation shaft 1) with the through holes 17h. The through holes 17h, 17h, ... in the fifth embodiment of the invention are in the shape of a circle from a view in a direction that the rotation shaft 1 extends, as shown in the drawings, and can be formed in a simple drilling process. The flow path 17e for the air passing through the radiator 17 to flow from the drive side to the side opposite to the drive side as shown by the arrows D comprises the plural grooves 17g, 17g, ... and the plural through holes 17h, 17h, ....

In the fifth embodiment of the invention, the surface 17c on the drive side of the radiator 17 is a flat surface with no cooling piece 17b shown in the first to fourth embodiments of the invention. Providing the groove 17g and through hole 17h in plural numbers, however, enables the quantity of the air passing through the radiator 17 to flow from the drive side to the side opposite to the drive side as shown by the arrows D to be sufficiently secured simultaneously with securing the radiation area of the radiator 17. Accordingly, the radiator 17 can be easily manufactured and an effect of cooling the radiator 17 and the bearing 7 on the drive side can be improved.

Sixth Embodiment

Figure 10:
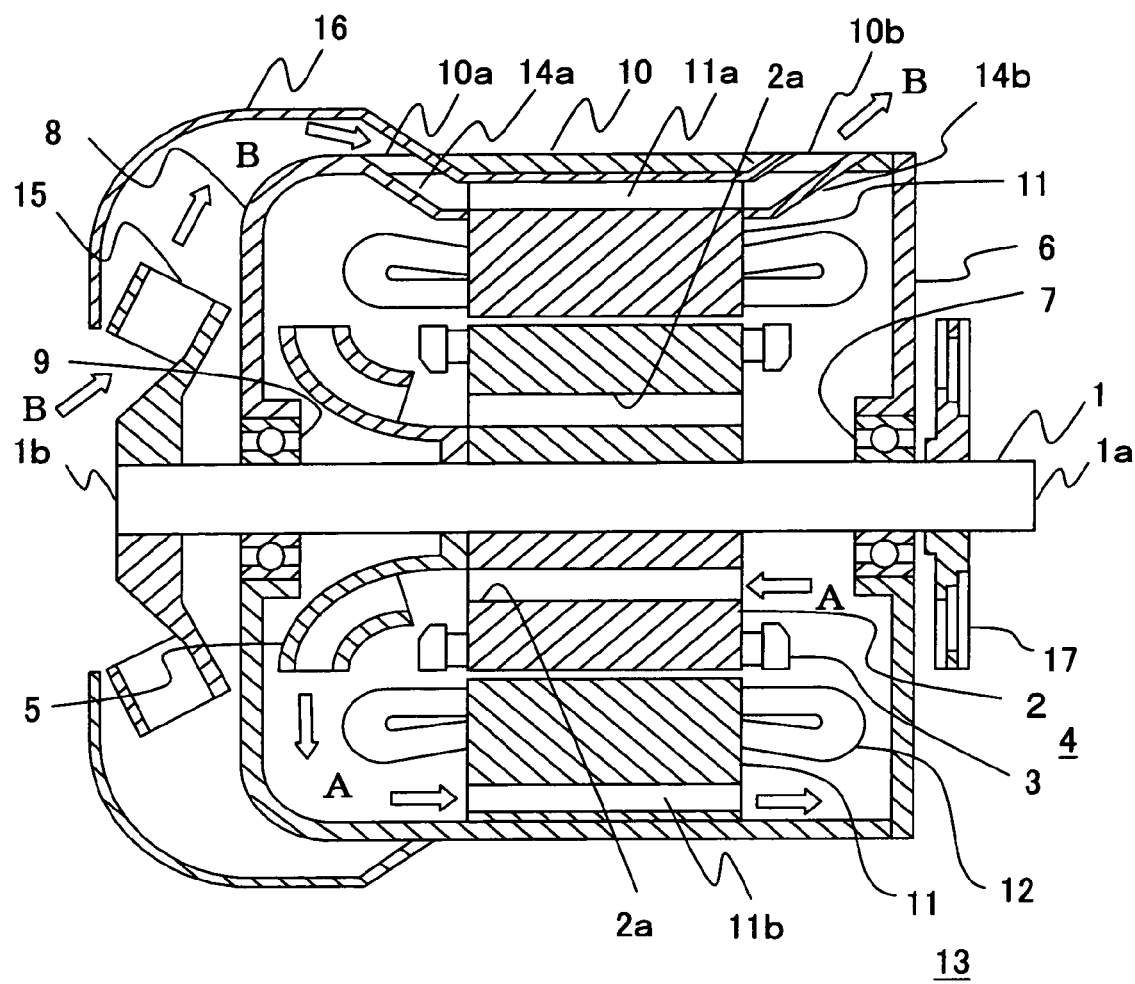
FIG. 10 is a sectional view of a totally-enclosed fan-cooled motor in a sixth embodiment of the invention.
Figure 11:
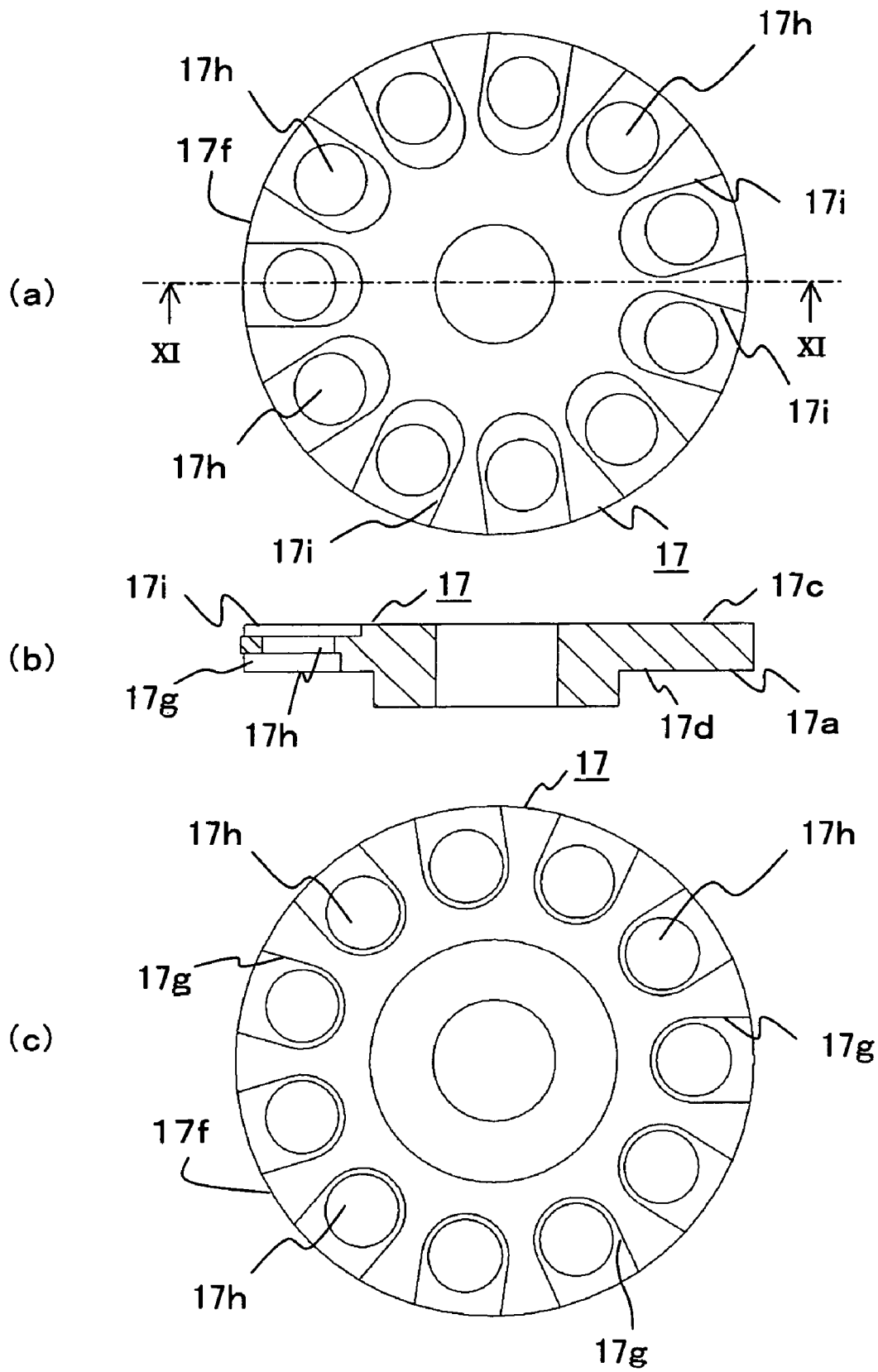

FIG. 10 is a sectional view of a totally-enclosed fan-cooled motor in a sixth mode for carrying out the invention. FIG. 11A is a front view of an integral part in FIG. 10. FIG. 11B is a sectional view taken away from a line XI-XI in FIG. 11A. FIG. 11C is a back view. In FIGS. 10 and 11, elements same as or equal to those in FIGS. 1 to 9 are marked with the same reference signs and numerals. The sixth embodiment of the invention will be described hereinafter mainly in a point different from the first to fifth embodiments of the invention. Description other than the different point will be omitted.

In FIGS. 10 and 11, provided are plural second grooves 17i, 17i, ... radially on the surface 17c on the drive side of the radiator 17. Providing the plural second grooves 17i, 17i, ... on the drive side allows the cool air on the drive side of the radiator 17 to pass through the plural second grooves 17i, 17i, ... on the drive side, the plural through holes 17h, 17h, ... the plural gaps g, g, ... between the respective cooling pieces 17b, 17b, ... and the plural grooves 17g, 17g, ... on the side opposite to the drive side to flow to the space between the drive side bracket 6 and the radiator 17, so that the quantity of the air becomes more than that in the fifth embodiment of the invention (FIG. 9). This as well as an effect of enlarging the radiation area of the radiator 17 by means of the plural second grooves 17i, 17i, ... on the drive side allows a cooling effect of the radiator 17 and the bearing 7 on the driving side to be improved more than the case of the fifth embodiment of the invention. In addition, the radiator 17 can be manufactured more easily than the cases shown in FIGS. 1 to 7.

All of the plural second grooves 17i, 17i, ... on the drive side are formed so that the length in the diameter direction is longer on a side closer to the rotation shaft 1 than that of the plural grooves 17g, 17g, ... on the side opposite to the drive side, as shown in the drawings. Such a structure allows the quantity of the air flow generated in accordance with rotation of the radiator 17 to be increased more than the case in the fifth embodiment of the invention (refer to FIG. 9).

Seventh Embodiment

Figure 12:
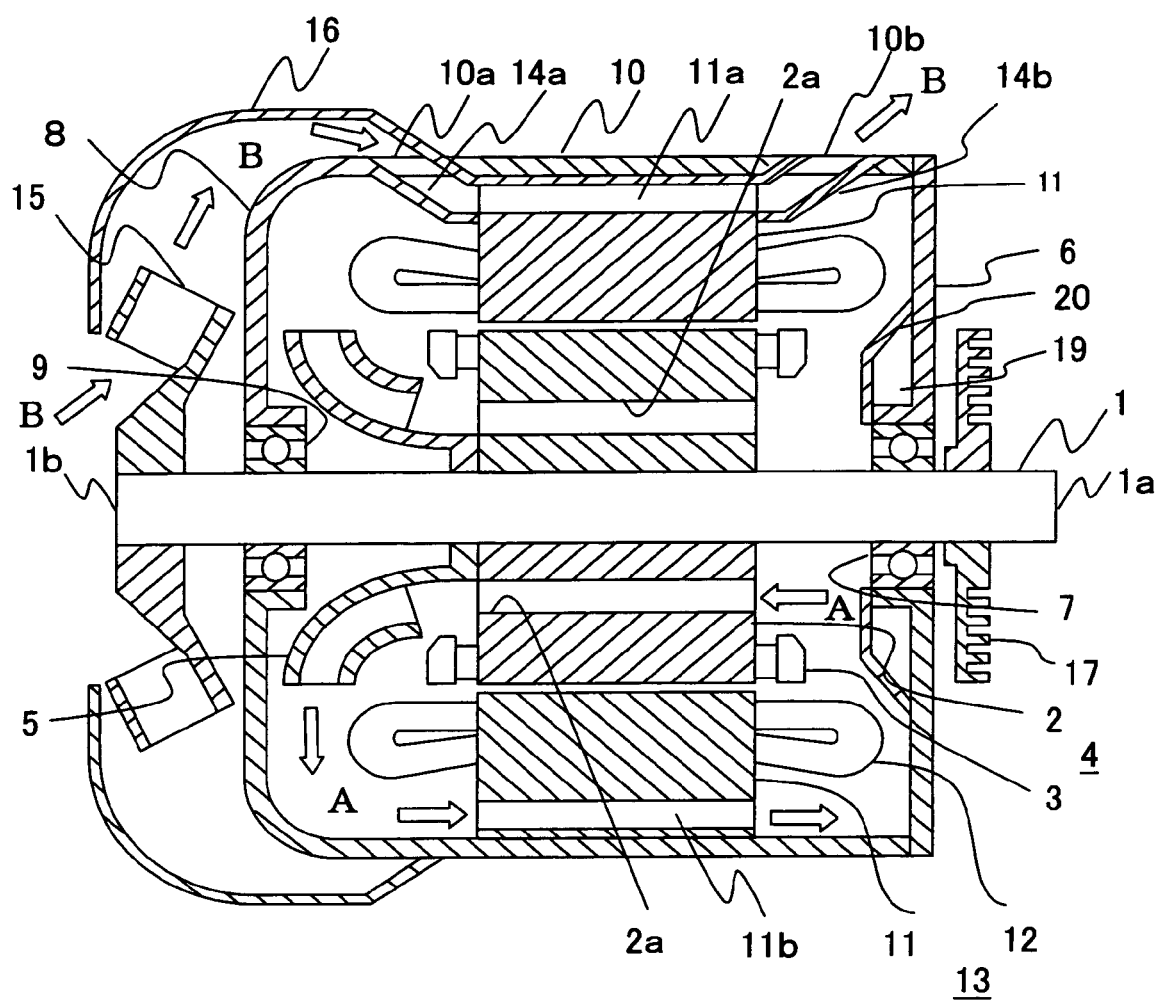
FIG. 12 is a sectional view of a totally-enclosed fan-cooled motor in a seventh embodiment of the invention.

FIG. 12 is a sectional view of a totally-enclosed fan-cooled motor in a seventh mode for carrying out the invention. In FIG. 12, elements same as or equal to those in FIGS. 1 to 11 are marked with the same reference signs and numerals. The seventh embodiment of the invention will be described hereinafter mainly in a point different from the first to sixth embodiments of the invention. Description other than the different point will be omitted.

In the seventh embodiment of the invention, provided is an insulation air layer 19 separated from air of high temperature in the motor and enclosing the outer circumference of the bearing 7 on the drive side. The insulation air layer 19 is formed between a part (a part adjacent to the bearing 7 on the drive side) of the drive side bracket 6 and a covering plate 20 provided in the vicinity of the bearing 7 on the drive side and inside the motor so as to be air-tightly separated from the other part of the inside of the motor by means of the cover plate 20. Accordingly, the air flow of high temperature in the motor, which is shown by arrows A, is not directly in contact with the bearing 7 on the drive side and the part of the drive side bracket 6 (a part adjacent to the bearing 7 on the drive side). That is to say, in a totally-enclosed fan-cooled motor having such a structure, internal-air circulating wind of high temperature, which is generated from the internal fan 5 as shown by the arrows A, prevents the bearing 7 on the drive side from being directly heated.

Therefore, providing the cover plate 20 in the vicinity of the bearing 7 on the drive side and inside the motor as well as the insulation air layer 19, which is separated from air of high temperature in the motor by means of the cover plate 20 and which encloses the outer circumference of the bearing 7 on the drive side, allows the cooling effect of the radiator 17 and the bearing 7 to be more improved.

In the seventh embodiment of the invention, in the case that the air layer 19 is provided in a totally-enclosed fan-cooled motor in which an output is 150 kw, an outer diameter of the frame 10 is 580 mm and a length of the rotation shaft 1 in the axial direction is 530 mm, for example, a rise in temperature of the bearing 7 can be reduced by around 4% in a value of a rise in temperature, compared with the case of providing no air layer 19.

Eighth Embodiment

Figure 13:
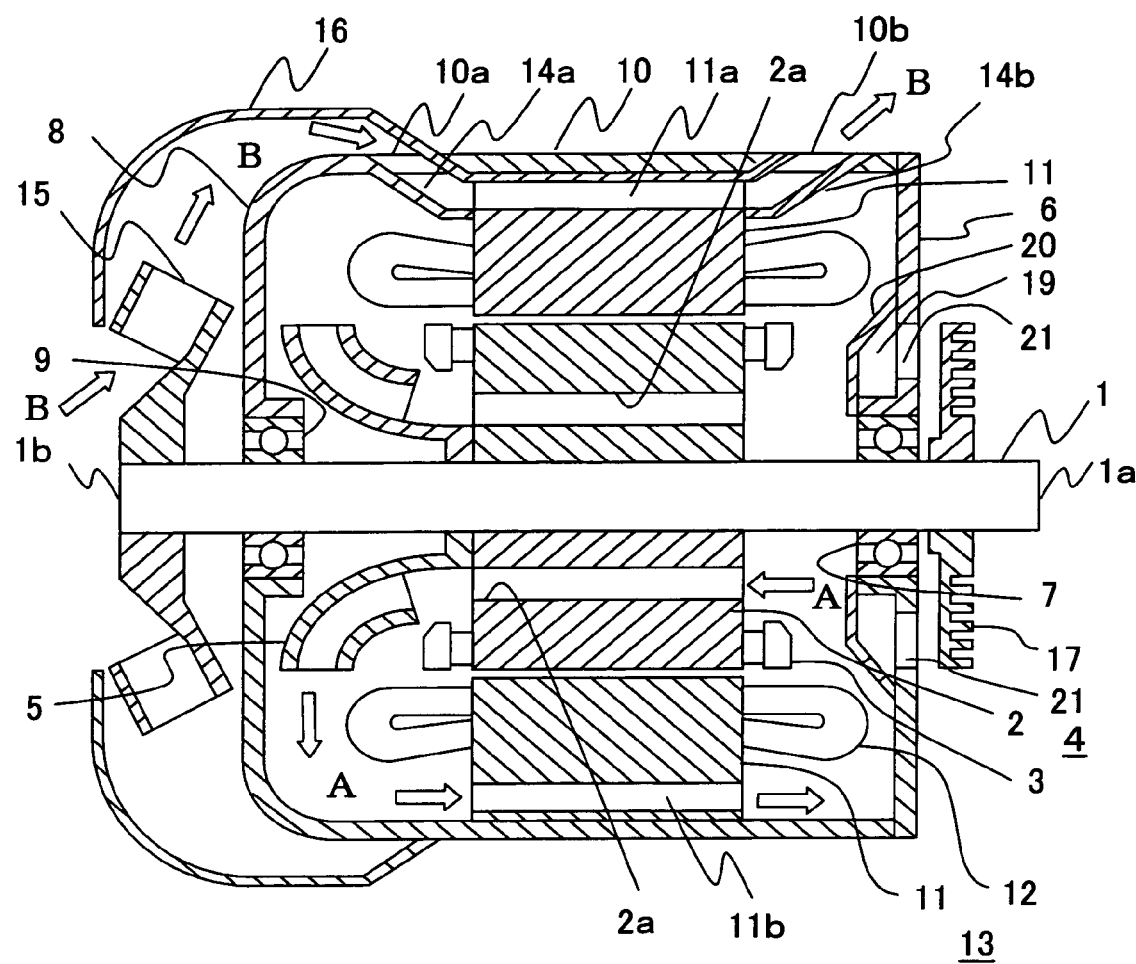
FIG. 13 is a sectional view of a totally-enclosed fan-cooled motor in an eighth embodiment of the invention.

FIG. 13 is a sectional view of a totally-enclosed fan-cooled motor in an eighth mode for carrying out the invention. In FIG. 13, elements same as or equal to those in FIGS. 1 to 12 are marked with the same reference signs and numerals. The eighth embodiment of the invention will be described hereinafter mainly in a point different from the first to seventh embodiments of the invention. Description other than the different point will be omitted.

In FIG. 13, in accordance with the eighth embodiment of the invention, plural ventilation holes 21 are formed in a part of the drive side bracket 6 so as to enclose the circumference of the bearing 7 on the drive side for the purpose of letting the external air flow in the air layer 19. The air layer 19 communicates with the external air outside the motor through the plural ventilation holes 21.

In a totally-enclosed fan-cooled motor having such a structure, internal-air circulating wind of high temperature, which is generated from the internal fan 5, prevents the bearing 7 on the drive side from being directly heated while cooling wind generated outside the motor in accordance with rotation of the radiator 17 agitates the air layer 19 through the ventilation holes 21. This cools the inner surfaces of the bearing 7 and the bracket 6, so that the cooling effect of the radiator 17 and the bearing 7 to be more improved than the case in the seventh embodiment of the invention.

In the eighth embodiment of the invention, in the case that the ventilation holes 21 are provided in a totally-enclosed fan-cooled motor in which an output is 150 kw, an outer diameter of the frame 10 is 580 mm and a length of the rotation shaft 1 in the axial direction is 530 mm, for example, a rise in temperature of the bearing 7 can be reduced by around 8% in a value of a rise in temperature, compared with the case of providing no ventilation hole 21.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A totally-enclosed fan-cooled motor comprising:
a stator provided in the air-tightly closed motor;
a rotor provided oppositely to the stator and mounted to a rotation shaft;
a pair of bearings for holding a drive side and a side opposite to the drive side of the rotation shaft;
an external fan provided on the side opposite to the drive side of the rotation shaft and outside the motor for sending wind to the stator;
an internal fan provided inside the motor for circulating air in the motor to send wind to the rotor and the stator;
a radiator mounted to the rotation shaft so as to be located on an outer side of the bearing holding the drive side of the rotation shaft, outside the motor and in the vicinity of the bearing for cooling the bearing holding the drive side of the rotation shaft, wherein the radiator includes:
a plurality of through holes passing through both of a surface on the drive side and a surface on the side opposite to the drive side, and
a plurality of grooves on a surface on the side opposite to the drive side, one end of the respective grooves being opened to an outer circumferential surface of the radiator, an area of the respective grooves being larger than an area of the respective through holes in view of a longitudinal direction of the rotation shaft, the plurality of grooves and plurality of through holes from a plurality of flow paths in which air flows from the drive side of the radiator to the side opposite to the drive side of the radiator and flows from the inner circumferential side to the outer circumferential side in the respective grooves.

2. The totally-enclosed fan-cooled motor according to claim 1, wherein the plurality of grooves respectively extending in a direction away from the rotation shaft.

3. The totally-enclosed fan-cooled motor according to claim 1, wherein
a plurality of through holes located in a part of the respective grooves closer to the rotation shaft.

4. The totally-enclosed fan-cooled motor according to claim 1, wherein the radiator includes:
a plurality of grooves provided on both of a surface on the drive side and a surface on the side opposite to the drive side and respectively extending in a direction away from the rotation shaft, one end of the respective grooves being opened to an outer circumferential surface of the radiator; and
wherein said plurality of through holes are located in a part of the respective grooves closer to the rotation shaft and passing through both of the surface on the drive side and the surface on the side opposite to the drive side, wherein the grooves and the through holes form a plurality of flow paths in which air flows from the drive side of the radiator to the side opposite to the drive side of the radiator.

5. The totally-enclosed fan-cooled motor according to claim 4, wherein a length of the groove on the surface on the drive side of the radiator in a diameter direction is longer on a side of the rotation shaft than a length of the groove on the surface on the side opposite to the drive side in the diameter direction.

6. The totally-enclosed fan-cooled motor according to claim 1, wherein the radiator includes:
a plate-shaped part formed concentrically with the rotation shaft and the plate-shaped part having the plurality of through holes and the plurality of grooves.

7. The totally-enclosed fan-cooled motor according to claim 1, further comprising:
a wind direction guide provided on the drive side for receiving wind sent from the external fan to change a direction of the wind toward the radiator.

8. The totally-enclosed fan-cooled motor according to claim 1, wherein an air layer separated from an air of high temperature in the motor encloses an outer circumference of the bearing holding the drive side of the rotation shaft.

9. The totally-enclosed fan-cooled motor according to claim 8, wherein a space between the bearing holding the drive side of the rotation shaft and the radiator communicates with the air layer.

10. The totally-enclosed fan-cooled motor according to claim 1, wherein each center of the through holes is located in a part of the respective grooves.

11. A totally-enclosed fan-cooled motor comprising:
a stator provided in the air-tightly closed motor;
a rotor provided oppositely to the stator and mounted to a rotation shaft;
a pair of bearings for holding a drive side and a side opposite to the drive side of the rotation shaft;

an external fan provided on the side opposite to the drive side of the rotation shaft and outside the motor for sending wind to the stator;

an internal fan provided inside the motor for circulating air in the motor to send wind to the rotor and the stator; and a radiator mounted to the rotation shaft so as to be located on an outer side of the bearing holding the drive side of the rotation shaft, outside the motor and in the vicinity of the bearing for cooling the bearing holding the drive side of the rotation shaft, wherein the radiator includes:

a plurality of through holes passing through both of a surface on the drive side and a surface on the side opposite to the drive side, in which air flows from the drive side to the side opposite to the drive side, and a plurality of annular cooling pieces formed so as to project from a plate-shaped part on a side opposite to the side of the bearing holding the drive side, and having predetermined gaps respectively formed therebetween.

* * * * *